United States Patent
Zhang et al.

(10) Patent No.: US 9,906,813 B2
(45) Date of Patent: Feb. 27, 2018

(54) METHOD OF VIEW SYNTHESIS PREDICTION IN 3D VIDEO CODING

(71) Applicant: HFI INNOVATION INC., Zhubei, Hsinchu County (TW)

(72) Inventors: Xianguo Zhang, Beijing (CN); Kai Zhang, Beijing (CN); Jicheng An, Beijing (CN); Jian-Liang Lin, Yilan County (TW)

(73) Assignee: HFI INNOVATION INC., Zhubei, Hsinchu County (TW)

( * ) Notice: Subject to any disclaimer, the term of this patent is extended or adjusted under 35 U.S.C. 154(b) by 527 days.

(21) Appl. No.: 14/503,427

(22) Filed: Oct. 1, 2014

(65) Prior Publication Data
US 2016/0100190 A1 Apr. 7, 2016
US 2017/0332100 A9 Nov. 16, 2017

Related U.S. Application Data

(63) Continuation-in-part of application No. PCT/CN2013/084849, filed on Oct. 8, 2013.

(51) Int. Cl.
*H04N 19/597* (2014.01)
*H04N 19/119* (2014.01)
(Continued)

(52) U.S. Cl.
CPC ....... *H04N 19/597* (2014.11); *H04N 13/0022* (2013.01); *H04N 13/0048* (2013.01);
(Continued)

(58) Field of Classification Search
CPC .. H04N 19/597; H04N 19/119; H04N 19/139; H04N 19/176; H04N 19/0022; H04N 13/0048
See application file for complete search history.

(56) References Cited

U.S. PATENT DOCUMENTS

2010/0278232 A1 11/2010 Yea et al.
2013/0039417 A1 2/2013 Wang et al.
(Continued)

FOREIGN PATENT DOCUMENTS

CA 2 844 593 2/2013
CN 102055982 5/2011

OTHER PUBLICATIONS

Ikai, "VSP Partitioning for AMP," Joint Collaborative Team on 3D Video Coding Extensions of ITU-T SG 16 WP 3 and ISO/IEC JTC 1/SC 29/WG 11, Geneva, Oct./Nov. 2013.*
(Continued)

*Primary Examiner* — Thai Tran
*Assistant Examiner* — Christopher T Braniff
(74) *Attorney, Agent, or Firm* — McClure, Qualey & Rodack, LLP

(57) ABSTRACT

A method and apparatus for three-dimensional or multi-view video encoding and decoding using VSP (view synthesis prediction) with uniform sub-block partition are disclosed. For a current texture block comprising multiple partition blocks, the system derives a single partition decision and partitions each partition block of the current texture block into multiples sub-blocks according to the single partition decision. The VSP processing is then applied to each sub-block to derive the inter-view prediction using VSP. The single partition decision is derived using depth samples of the depth block in a reference view.

20 Claims, 4 Drawing Sheets

(51) Int. Cl.
*H04N 19/139* (2014.01)
*H04N 19/176* (2014.01)
*H04N 13/00* (2006.01)

(52) U.S. Cl.
CPC ......... *H04N 19/119* (2014.11); *H04N 19/139* (2014.11); *H04N 19/176* (2014.11)

(56) References Cited

U.S. PATENT DOCUMENTS

2014/0355685 A1* 12/2014 Chen ............... H04N 19/52
375/240.16
2015/0078450 A1* 3/2015 Chen ............ H04N 19/00769
375/240.16

OTHER PUBLICATIONS

Yea, S., et al.; "View Synthesis Prediction for Multiview Video Coding;" Mitsubishi Electric Research Laboratories; 2009; pp. 1-13.

Jager, F.; "Depth-based Block Partitioning for 3D Video Coding;" pp. 1-4.

Shimizu, entitled Adaptive block partitioning for VSP in Joint Collaborative Team on 3D Video Coding Extensions of ITU-T SG 16 WP 3 and ISO/IEC JTC 1/SC 29/WG 11, 5th Meeting: Vienna, AT, Jul. 27-Aug. 2, 2013, document: JCT3V-E0207).

\* cited by examiner

*Prior Art*

(A)

(B)

METHOD OF VIEW SYNTHESIS PREDICTION IN 3D VIDEO CODING

CROSS REFERENCE TO RELATED APPLICATIONS

The present invention claims priority to PCT Patent Application, Serial No. PCT/CN2013/084849, filed on Oct. 8, 2013, entitled "Methods for View Synthesis Prediction". The PCT Patent Application is hereby incorporated by reference in its entirety.

FIELD OF THE INVENTION

The present invention relates to three-dimensional video coding. In particular, the present invention relates optimized methods for view synthesis prediction (VSP) in a three-dimensional (3D) coding system.

BACKGROUND AND RELATED ART

Three-dimensional (3D) television has been a technology trend in recent years that intends to bring viewers sensational viewing experience. Various technologies have been developed to enable 3D viewing and the multi-view video is a key technology for 3DTV application among others. Since all cameras capture the same scene from different viewpoints, multi-view video data contains a large amount of inter-view redundancy. To exploit the inter-view redundancy, 3D coding tools such as view synthesized prediction (VSP) have been integrated to conventional 3D-HEVC (High Efficiency Video Coding) or 3D-AVC (Advanced Video Coding) codec.

The basic concept of the VSP in current 3D-HEVC Test Model (3DV-HTM) is illustrated in FIG. 1. VSP locates the reconstructed depth data of the reference view and uses it as virtual depth for the current PU. A technique named Neighboring Block Disparity Vector (NBDV) is used to locate the reconstructed depth data. In FIG. 1, a current prediction unit (PU) (112) in a dependent texture picture (110) is being coded. A disparity vector (130) of neighboring block (114) of the current block (112) is identified, where the disparity vector (130) points to a block (124) in the reference depth picture (120). The disparity vector (130') is then used by the current PU (112) to location a corresponding reference depth block (122) in the reference depth picture (120). The reference depth block (122) is used as the virtual depth block for the current PU (112). Then prediction signals are generated with a disparity vector derived from the virtual depth for each 8×8 partition in the PU. The disparity values derived from the virtual depth block are used to locate corresponding reference samples in the reference texture picture. For example, three samples in the current texture block (112) are mapped to three samples in the reference texture picture (140) according to respective disparity values as indicated by three arrows (150a-c). The mapping process is named backward warping.

An adaptive block partitioning for VSP is disclosed by Shimizu, entitled *Adaptive block partitioning for VSP* in Joint Collaborative Team on 3D Video Coding Extensions of ITU-T SG 16 WP 3 and ISO/IEC JTC 1/SC 29/WG 11, 5th Meeting: Vienna, AT, 27 Jul.-2 Aug. 2013, document: JCT3V-E0207). In JCT3V-E0207, each 8×8 block can be partitioned into two 8×4 partitions, or two 4×8 partitions independently as depicted in FIG. 2 for a 32×32 PU. A determination process is invoked for each 8×8 block of the PU to select either the 8×4 partition or the 4×8 partition according to If (vdepth[TL]<vdepth[BR]?0:1)^ (vdepth[TR]<vdepth[BL]?0:1),
    Use 4×8 partition;
Else,
    Use 8×4 partition, where vdepth[TL], vdepth[BR], vdepth[TR] and vdepth[BL] corresponds to the depth samples at four corners (i.e., top-left, bottom-right, top-right and bottom-left respectively) of each 8×8 depth block. The depth value at top-left is compared to the depth sample at bottom-right (i.e. (vdepth[TL]<vdepth[BR]?0:1)). If vdepth[TL] is smaller than vdepth[BR], a "0" is assigned to the result and, otherwise, a "1" is assigned to the result. Similarly, the depth value at top-right is compared to the depth sample at bottom-left (i.e. (vdepth[TR]<vdepth[BL]?0:1)). If vdepth[TR] is smaller than vdepth[BL], a "0" is assigned to the result and, otherwise, a "1" is assigned to the result. If both results are not the same, 4×8 partition is used. Otherwise, 8×4 partition is used. As shown in the above test procedure, two comparisons, one Exclusive-Or and one test for final value to be "0" or "1" have to be performed.

The adaptive block partition by Shimizu presents two problems. First, the determination process may be invoked many times for a large PU. For example, if the PU size is 64×64, the determination process will be invoked 64 times. Second, the memory access method is irregular for a PU, which is unfriendly to paralleling process.

Accordingly, it is desirable to develop adaptive block partition that can adaptively select a block size to improve performance over a non-adaptive system while maintaining regular memory access.

BRIEF SUMMARY OF THE INVENTION

A method and apparatus for three-dimensional or multi-view video encoding and decoding using VSP (view synthesis prediction) with uniform sub-block partition are disclosed. For a current texture block comprising multiple partition blocks, embodiments according to the present invention derive a single partition decision and partition each partition block of the current texture block into multiples sub-blocks according to the single partition decision. The VSP processing is then applied to each sub-block to derive the inter-view prediction using VSP.

In one embodiment, each partition block is partitioned into multiples sub-blocks horizontally or vertically according to the single partition decision. In another embodiment, the partition block is partitioned into sub-blocks having the same size, where each sub-block has sub-block width larger than sub-block height when the single partition decision has a first value, and each sub-block has the sub-block width less than the sub-block height when the single partition decision has a second value. In yet another embodiment, each partition block is partitioned into sub-blocks horizontally when the single partition decision has a first value, and each partition block is partitioned into sub-blocks vertically when the single partition decision has a second value.

According to one embodiment, the single partition decision for the current texture block is derived using four corner depth samples of the depth block, where the four corner depth samples correspond to a left-top depth sample, a right-bottom depth sample, a right-top depth sample and a left-bottom depth sample. A first test regarding whether the left-top depth sample is larger than the right-bottom depth sample is performed and a second test regarding whether the right-top depth sample is larger than the left-bottom depth sample is performed. When the first test has the same result as the second test, the single partition decision has a first value; and when the first test has a different result from the second test, the single partition decision has a second value.

Alternatively, the single partition decision for the current texture block can be derived using four centric depth samples of the depth block, where the four centric depth samples are determined from center depth samples of a left part, a right part, a top part and a bottom part of the depth block respectively. The top-bottom absolute difference (UDD) and left-right absolute difference (LRD) are calculated. The UDD corresponds to absolute difference between the centric depth sample of the top part and the centric depth sample of the bottom part, and the LRD corresponds to the absolute difference between the centric depth sample of the left part and the centric depth sample of the right part. When the UDD is larger than the LRD, the single partition decision has a first value; and when t the UDD is less than the LRD, the single partition decision has a second value.

The current texture block may correspond to a texture PU (prediction unit) or a texture CU (coding unit). The current texture block size may be 64×64, 64×32, 32×64, 32×32, 32×16, 16×32, 16×16, 16×8, or 8×16, and the partition block size may be 32×32, 16×16 or 8×8. The derived DV can be determined based on one or more disparity vectors of one or more neighboring blocks of the current texture block. A flag can be transmitted in a sequence, view, picture, or slice level to indicate VSP type. When the flag is asserted, the partition block of the current texture block is partitioned into multiples sub-blocks according to the single partition decision. If the flag is not asserted, each partition block of the current texture block is partitioned into multiples sub-blocks according to individual decision.

DETAILED DESCRIPTION OF THE INVENTION

The following description is of the best-contemplated mode of carrying out the invention. The description is intended for the purpose of illustrating the general principles of the invention and shall not be construed as limitation to the invention. The scope of the invention is best determined by reference to the appended claims.

Figure 1:
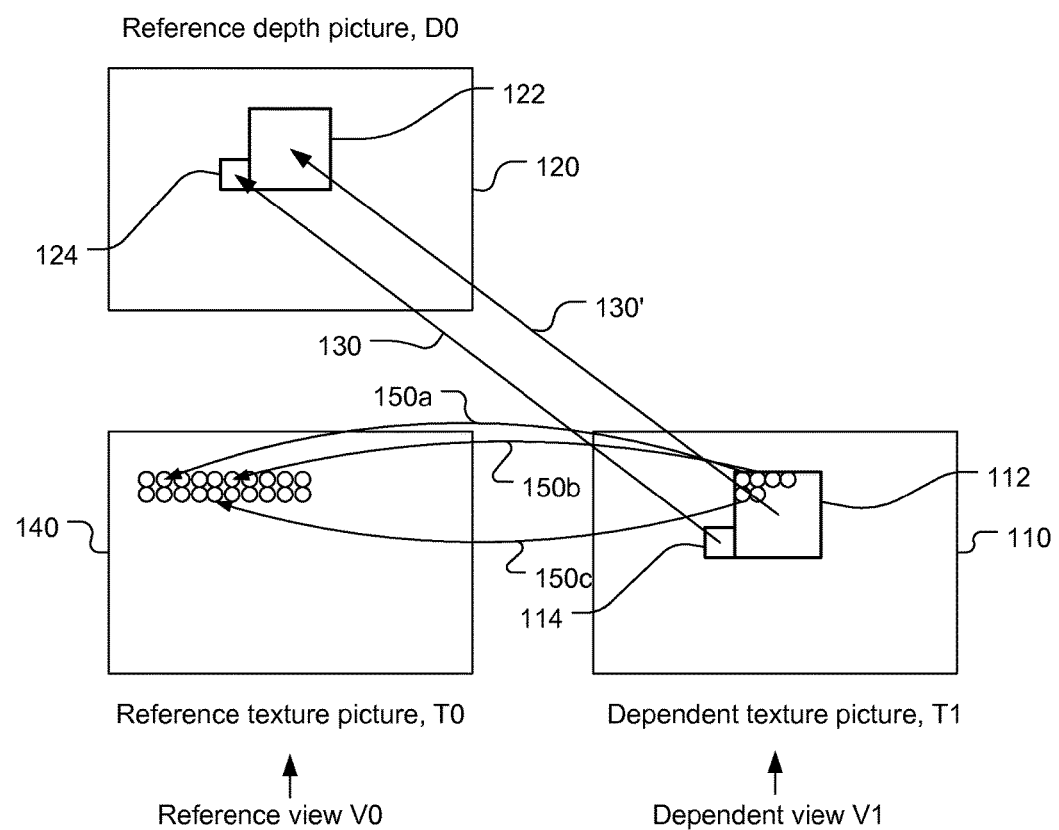
FIG. 1 illustrates exemplary view synthesis prediction (VSP) process, where a depth block in the reference view is located and the depth values are used to locate the reference samples in the reference view using backward warping for inter-view prediction.
Figure 2:
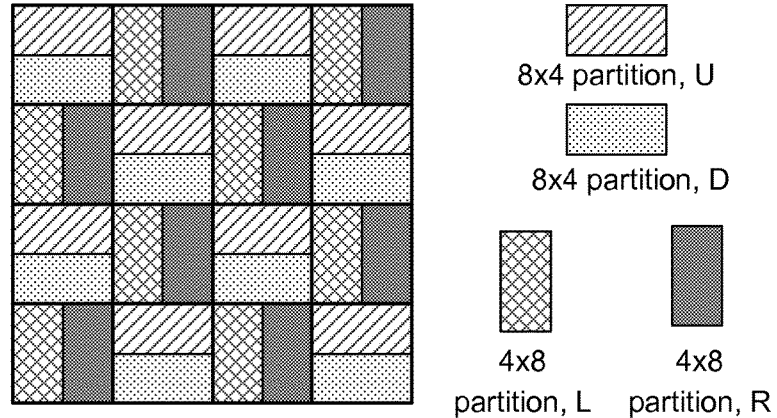
FIG. 2 illustrates an example of partitioning each 8×8 block in a PU according to individual partition decision according to a prior art.
Figure 3:
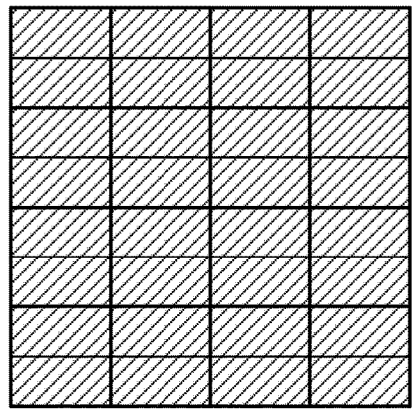
FIG. 3 illustrates an example of partitioning each 8×8 block in a PU according to a single partition decision for the PU according to an embodiment of the present invention.
Figure 3:
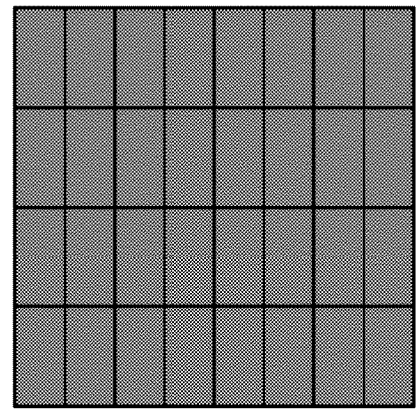

As mentioned before, the adaptive block partition disclosed in a prior art by Shimizu presents high complexity issue for large PU size and irregular memory access. Accordingly, a method to determine the partitions for VSP of a PU is disclosed. FIG. 3 illustrates one embodiment of the present invention, where the partition is uniform for the whole PU according to a single partition decision. In the example, the 8×8 blocks of the 32×32 PU are all partitioned into 8×4 sub-blocks (shown in the left side of FIG. 3) or 4×8 sub-blocks (shown in the right side of FIG. 3). For convenience, the unit of block that is subject to splitting is referred as a "partition block" in this disclosure. Accordingly, each 8×8 block in the above example is referred as a "partition block". The current invention is also applicable to other partition block sizes. For example, the partition size may also correspond to 32×32 or 16×16. Depending on the partition block size, the partition may result in sub-block sizes other than 8×4 and 4×8. For example, for partition size 32×32, the horizontal splitting may result in sub-block sizes 32×16, 32×8 (i.e. 4 sub-blocks per partition block), and 32×4 (i.e. 8 sub-blocks per partition block). For partition size 16×16, the horizontal splitting may result in sub-block sizes 16×8 and 16×4 (i.e. 4 sub-blocks per partition block). For vertical splitting, the partition size 32×32 may result in sub-block sizes 16×32, 8×32 (i.e. 4 sub-blocks per partition block), and 4×32 (i.e. 8 sub-blocks per partition block). Partition size 16×16 may result in sub-block sizes 8×16 and 4×16 (i.e. 4 sub-blocks per partition block).

Figure 4:
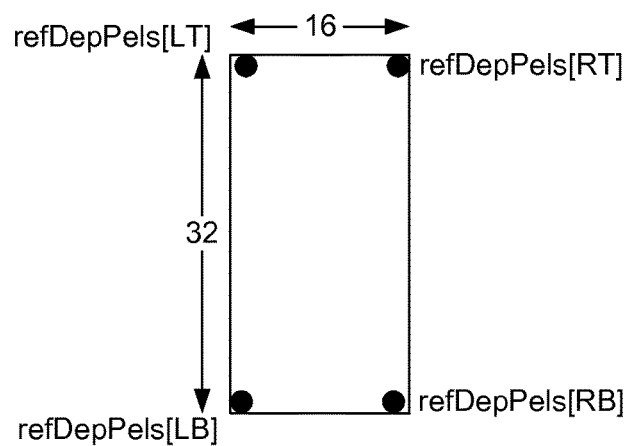
FIG. 4 illustrates an example of using four corner depth samples to derive the single partition decision for VSP.

According to the present invention, a single partition decision is made for a whole prediction unit (PU) or a whole coding unit (CU) instead for each partition block. This will significantly reduce the required operations associated with partition decision. The single partition decision is made based on the virtual depth derived. One embodiment of the present invention to perform PU partition for view synthesis prediction (VSP) is illustrated as follows.

a. First, the Neighboring Block Disparity Vector (NBDV) process for deriving a DV for the current PU based on neighboring blocks is used.

b. The virtual depth corresponding to the current prediction unit is obtained from the reconstructed depth of the reference view by using the NBDV.

c. Determining four corner points of the virtual depth corresponding to the current PU, where the four corner points are denoted as refDepPels[LT], refDepPels[RB], refDepPels[RT] and refDepPels[LB] as shown in FIG. 4 for a 16×32 PU.

d. Determining horizontal splitting flag, horSplitFlag according to horSplitFlag=((refDepPels[LT]>refDepPels[RB])==(refDepPels[RT]>refDepPels[LB])).
When both (refDepPels[LT]>refDepPels[RB]) and (refDepPels[RT]>refDepPels[LB]) are true or false, horSplitFlag has a value of "1". Otherwise, horSplitFlag has a value of "0".

e. Partitioning the current PU into W×H sub-blocks according to the horizontal splitting flag, horSplitFlag, where W corresponds to the width of the sub-block and H corresponds to the height of the sub-block. W equals to 8>>(1-horSplitFlag) and H equals to 8>>horSplitFlag. If horSplitFlag equals to 1, the partition line for the 8×8 block is in the horizontal direction to result in 8×4 sub-blocks as shown in the left side of FIG. 4. Otherwise, the partition line for the 8×8 block is in the vertical direction to result in 4×8 sub-blocks. The particular W and H derivation shown here is meant to illustrate an example of sub-block partition. The present invention is applicable to partition block size larger than 8×8. Furthermore, the above example only split each partition block into two sub-blocks horizontally or vertically. The present invention may also split a partition block into more than two sub-blocks. For example, a partition block may be partitioned into four or eight sub-blocks horizontally or vertically according to the single partition decision.

Finally, for each W×H sub-block, the VSP processing is as follows:
1. The derived virtual depth is converted into corresponding disparity vector;
2. The predicted data in the reference view is obtained by using the disparity vector;
3. The predicted data from view synthesis prediction is then used for encoding and decoding of the current PU.

In the above example, a first test is performed regarding whether refDepPels[LT] is larger than refDepPels[RB] and a second test is performed regarding whether refDepPels[RT] is larger than refDepPels[LB]. A person skilled in the art may use other similar test to practice the present invention without departing from the spirit of the present invention. For example, instead of testing "greater than", the test can be modified to "less than", "no less than", "no greater", etc. to achieve similar effect. Furthermore, a skilled person may also use vertical split flag (verSplitFlag) based on similar tests to practice the present invention.

The single partition decision is based on four corner depth samples in the above example. However, the present invention may use other depth samples from the depth block. For example, four centric depth samples may be used to derive the single partition decision. The two centric depth samples are determined from center depth samples of a left part and a right part of the depth block. The other two centric depth samples are determined from center depth samples of a top part and a bottom part of the depth block. In this case, the top-bottom absolute difference (UDD) is calculated, where UDD corresponds to the absolute difference between the centric depth sample of the top part and the centric depth sample of the bottom part. Also, the left-right absolute difference (LRD) is calculated, where LRD corresponds to the absolute difference between the centric depth sample of the left part and the centric depth sample of the right part. If UDD is larger than LRD, the single partition decision has a first value. In this case, each partition block may be partitioned into sub-blocks having the sub-block width larger than the sub-block height. Otherwise, the single partition decision has a second value. In this case, each partition block may be partitioned into sub-blocks having the sub-block width less than the sub-block height.

The operations required for a PU partition incorporating an embodiment of the present invention (labelled as "Uniform") can be substantially reduced compared to a conventional approach (labelled as "Anchor"). Table 1 illustrates the comparison for various PU sizes. The operations required for PU partition include comparison (Comp.), Exclusive OR (XOR) and Test for whether the value being zero (Test Zero). As shown in Table 1, the operations are significantly reduces particularly for large PU sizes.

TABLE 1

| PU Size | Partition decision | | | | | |
|---|---|---|---|---|---|---|
| | Anchor | | | Uniform | | |
| | Comp. | XOR | Test Zero | Comp. | XOR | Test Zero |
| 64 × 64 | 128 | 64 | 64 | 2 | 1 | 1 |
| 64 × 32 | 64 | 32 | 32 | 2 | 1 | 1 |
| 32 × 64 | 64 | 32 | 32 | 2 | 1 | 1 |

TABLE 1-continued

| PU Size | Partition decision | | | | | |
|---|---|---|---|---|---|---|
| | Anchor | | | Uniform | | |
| | Comp. | XOR | Test Zero | Comp. | XOR | Test Zero |
| 32 × 32 | 32 | 16 | 16 | 2 | 1 | 1 |
| 32 × 16 | 16 | 8 | 8 | 2 | 1 | 1 |
| 16 × 32 | 16 | 8 | 8 | 2 | 1 | 1 |
| 16 × 16 | 8 | 4 | 4 | 2 | 1 | 1 |
| 16 × 8 | 4 | 2 | 2 | 2 | 1 | 1 |
| 8 × 16 | 4 | 2 | 2 | 2 | 1 | 1 |
| 8 × 8 | 2 | 1 | 1 | 2 | 1 | 1 |
| 8 × 4 | 0 | 0 | 0 | 0 | 0 | 0 |
| 4 × 8 | 0 | 0 | 0 | 0 | 0 | 0 |

Furthermore, since the partition is uniform for a whole PU, there is no need to transmit individual partition flag for each 8×8 block. Therefore, the bitrate associated with the partition flags can be substantially reduced. Table 2 illustrates the comparison between a system incorporating an embodiment of the present invention (labelled as "Uniform") and a conventional approach (labelled as "Anchor").

TABLE 2

| Flags for partition PU Size | Anchor Num. | Uniform Num. |
|---|---|---|
| 64 × 64 | 64 | 1 |
| 64 × 32 | 32 | 1 |
| 32 × 64 | 32 | 1 |
| 32 × 32 | 16 | 1 |
| 32 × 16 | 8 | 1 |
| 16 × 32 | 8 | 1 |
| 16 × 16 | 4 | 1 |
| 16 × 8 | 2 | 1 |
| 8 × 16 | 2 | 1 |
| 8 × 8 | 1 | 1 |
| 8 × 4 | 0 | 0 |
| 4 × 8 | 0 | 0 |

In some embodiments, a VSP type flag can be transmitted in a sequence, view, picture, or slice level to indicate whether the uniform PU partition according to the present invention is used or conventional PU partition with individual partition decision is used. When the flag is asserted, the partition block of the current texture block is partitioned into multiples sub-blocks according to the single partition decision. If the flag is not asserted, each partition block of the current texture block is partitioned into multiples sub-blocks according to individual decision As mentioned earlier, the present invention is intended to reduce complexity as well as to relieve irregular memory access due to conventional 8×8 PU partition for view synthesized prediction (VSP). The performance of a 3D video coding system incorporating the uniform PU partition according to an embodiment of the present invention is compared to the performance of a conventional system as shown in Table 3, where the partition of each 8×8 block for the conventional system is performed independently and the decision is made individually. The performance comparison is based on different sets of test data listed in the first column. The BD-rate differences are shown for texture pictures in view 1 (video 1) and view 2 (video 2). A negative value in the BD-rate implies that the present invention has a better performance. The BD-rate measure for the coded video PSNR with video bitrate, the coded video PSNR with total bitrate (texture bitrate and depth bitrate), and the synthesized video PSNR with total bitrate are also shown.

As shown in Table 3, there is no performance loss compared to the conventional system. Actually, some minor performance improvement has been noted. The processing times (encoding time, decoding time and rendering time) are also compared. As shown in Table 3, slight improvement has been noted in all processing times. Accordingly, the system that uses uniform PU partition for VSP according to one embodiment of the present invention incurs no performance loss compared to the conventional system while providing reduced computational complexity and regular memory access.

TABLE 3

|  | Video 0 | Video 1 | Video 2 | Video PSNR/ video bitrate | Video PSNR/ total bitrate | Synth PSNR/ total bitrate | Enc time | Dec time | Ren time |
| --- | --- | --- | --- | --- | --- | --- | --- | --- | --- |
| Balloons | 0.0% | −0.2% | 0.0% | 0.0% | 0.0% | 0.0% | 99.3% | 100.3% | 100.1% |
| Kendo | 0.0% | 0.1% | −0.1% | 0.0% | 0.0% | 0.0% | 100.6% | 99.6% | 100.1% |
| NewspaperCC | 0.0% | 0.1% | 0.1% | 0.0% | 0.0% | 0.0% | 99.3% | 90.1% | 100.7% |
| GhostTownFly | 0.0% | −0.1% | −0.2% | 0.0% | 0.0% | 0.0% | 100.7% | 91.2% | 99.7% |
| PoznanHall2 | 0.0% | 0.2% | −0.2% | 0.0% | 0.0% | −0.1% | 99.4% | 93.6% | 98.2% |
| PoznanStreet | 0.0% | 0.2% | 0.0% | 0.0% | 0.0% | 0.0% | 99.2% | 104.8% | 100.5% |
| UndoDancer | 0.0% | −0.1% | −0.3% | 0.0% | 0.0% | 0.0% | 99.0% | 99.6% | 96.3% |
| Shark | 0.0% | −0.2% | 0.0% | 0.0% | 0.0% | 0.0% | 100.2% | 103.9% | 100.4% |
| 1024 × 768 | 0.0% | 0.0% | 0.0% | 0.0% | 0.0% | 0.0% | 99.8% | 96.7% | 100.3% |
| 1920 × 1088 | 0.0% | 0.1% | −0.2% | 0.0% | 0.0% | −0.1% | 99.6% | 97.3% | 98.7% |
| average | 0.0% | 0.0% | −0.1% | 0.0% | 0.0% | 0.0% | 99.6% | 97.0% | 99.3% |

Figure 5:
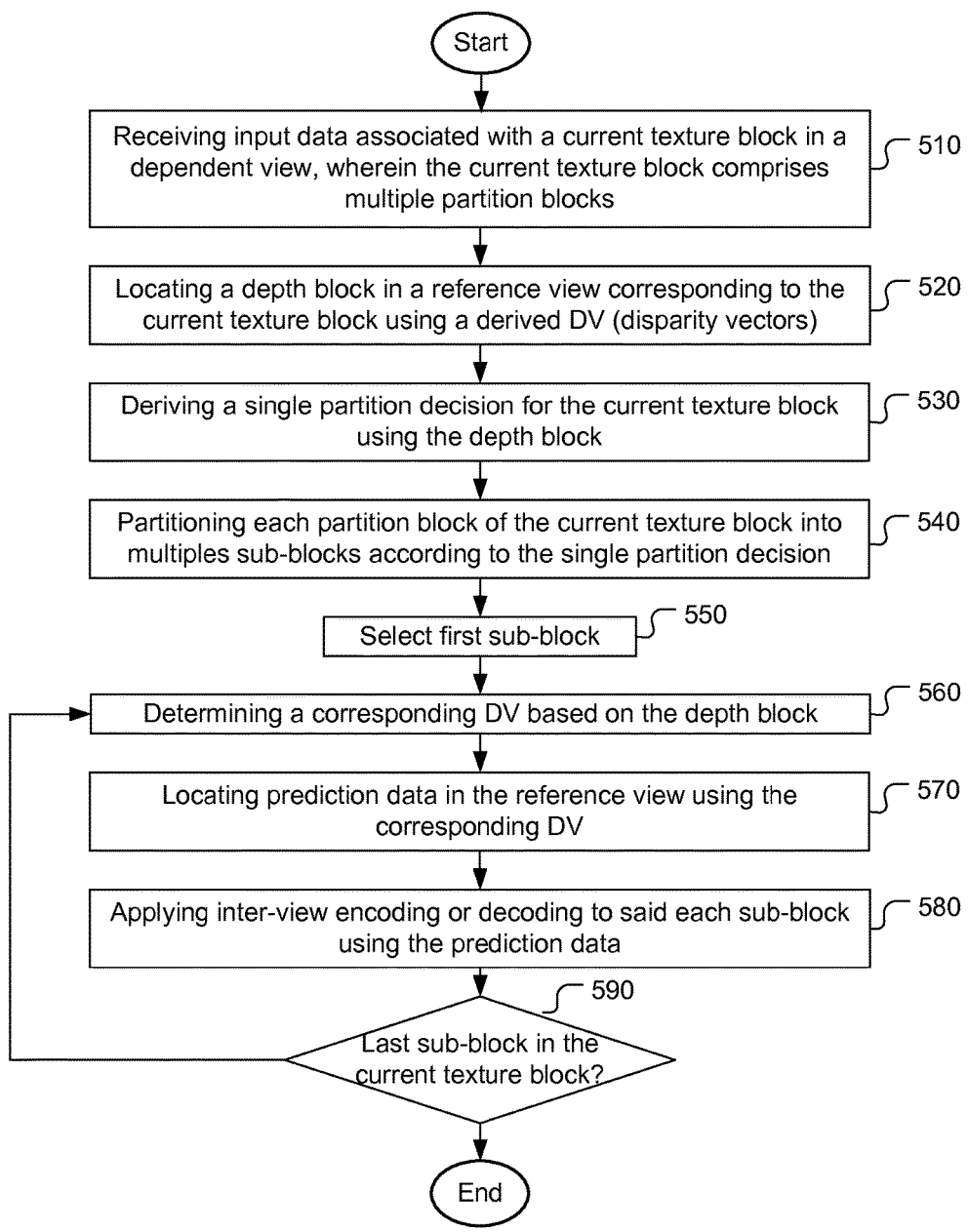
FIG. 5 illustrates an exemplary flowchart of a coding system incorporating sub-block view synthesis prediction (VSP) process according to an embodiment of the present invention.

FIG. 5 illustrates an exemplary flowchart of a three-dimensional encoding or decoding system incorporating uniform PU partition according to an embodiment of the present invention. The system receives input data associated with a current texture block in a dependent view in step 510, where the current texture block comprises multiple partition blocks. For encoding, the input data corresponds to texture data to be encoded. For decoding, the input data corresponds to coded texture data to be decoded. The input data may be retrieved from memory (e.g., computer memory, buffer (RAM or DRAM) or other media) or from a processor. A depth block in a reference view corresponding to the current texture block is located using a derived DV (disparity vectors) as shown in step 520. A single partition decision for the current texture block is derived using the depth block as shown in step 530. Each partition block of the current texture block is partitioned into multiples sub-blocks according to the single partition decision as shown in step 540. Each sub-block is then encoded or decoded using VSP process as shown in the loop consisting of steps 560 through step 590. The loop is initialized by pointing to the first sub-block as shown in step 550.

The flowcharts shown above are intended to illustrate examples 3D or multi-view coding with uniform partition according to the present invention. A person skilled in the art may modify each step, re-arranges the steps, split a step, or combine steps to practice the present invention without departing from the spirit of the present invention.

The above description is presented to enable a person of ordinary skill in the art to practice the present invention as provided in the context of a particular application and its requirement. Various modifications to the described embodiments will be apparent to those with skill in the art, and the general principles defined herein may be applied to other embodiments. Therefore, the present invention is not intended to be limited to the particular embodiments shown and described, but is to be accorded the widest scope consistent with the principles and novel features herein disclosed. In the above detailed description, various specific details are illustrated in order to provide a thorough understanding of the present invention. Nevertheless, it will be understood by those skilled in the art that the present invention may be practiced.

Embodiment of the present invention as described above may be implemented in various hardware, software codes, or a combination of both. For example, an embodiment of the present invention can be a circuit integrated into a video compression chip or program code integrated into video compression software to perform the processing described herein. An embodiment of the present invention may also be program code to be executed on a Digital Signal Processor (DSP) to perform the processing described herein. The invention may also involve a number of functions to be performed by a computer processor, a digital signal processor, a microprocessor, or field programmable gate array (FPGA). These processors can be configured to perform particular tasks according to the invention, by executing machine-readable software code or firmware code that defines the particular methods embodied by the invention. The software code or firmware code may be developed in different programming languages and different formats or styles. The software code may also be compiled for different target platforms. However, different code formats, styles and languages of software codes and other means of configuring code to perform the tasks in accordance with the invention will not depart from the spirit and scope of the invention.

The invention may be embodied in other specific forms without departing from its spirit or essential characteristics. The described examples are to be considered in all respects only as illustrative and not restrictive. The scope of the invention is therefore, indicated by the appended claims rather than by the foregoing description. All changes which come within the meaning and range of equivalency of the claims are to be embraced within their scope.

The invention claimed is:

1. A method for three-dimensional or multi-view video encoding or decoding using VSP (view synthesis prediction), the method comprising:
   receiving input data associated with a current texture block in a dependent view, wherein the current texture block comprises multiple partition blocks;
   locating a depth block in a reference view corresponding to the current texture block using a derived DV (disparity vectors);
   deriving a single partition decision for the current texture block using the depth block;

partitioning each partition block of the current texture block into multiples sub-blocks according to the single partition decision; and for each sub-block, determining a corresponding DV based on the depth block;

locating prediction data in the reference view using the corresponding DV; and applying inter-view encoding or decoding to said each sub-block using the prediction data.

2. The method of claim 1, wherein each partition block is partitioned into multiples sub-blocks horizontally or vertically according to the single partition decision.

3. The method of claim 1, wherein said multiples sub-blocks have a same size, each sub-block has sub-block width larger than sub-block height when the single partition decision has a first value, and each sub-block has the sub-block width less than the sub-block height when the single partition decision has a second value.

4. The method of claim 1, wherein each partition block is partitioned into said multiples sub-blocks horizontally when the single partition decision has a first value, and each partition block is partitioned into said multiples sub-blocks vertically when the single partition decision has a second value.

5. The method of claim 1, wherein the single partition decision for the current texture block is derived using four corner depth samples of the depth block, wherein the four corner depth samples correspond to a left-top depth sample, a right-bottom depth sample, a right-top depth sample and a left-bottom depth sample.

6. The method of claim 5, wherein a first test regarding whether the left-top depth sample is larger than the right-bottom depth sample is performed and a second test regarding whether the right-top depth sample is larger than the left-bottom depth sample is performed.

7. The method of claim 6, wherein when the first test has a same result as the second test, the single partition decision has a first value; and when the first test has a different result from the second test, the single partition decision has a second value.

8. The method of claim 1, wherein the single partition decision for the current texture block is derived using four centric depth samples of the depth block, wherein the four centric depth samples are determined from center depth samples of a left part, a right part, a top part and a bottom part of the depth block respectively.

9. The method of claim 8, wherein top-bottom absolute difference (UDD) and left-right absolute difference (LRD) are calculated, the UDD corresponds to absolute difference between the centric depth sample of the top part and the centric depth sample of the bottom part, and the LRD corresponds to the absolute difference between the centric depth sample of the left part and the centric depth sample of the right part.

10. The method of claim 9, wherein when the UDD is larger than the LRD, the single partition decision has a first value; and when t the UDD is less than the LRD, the single partition decision has a second value.

11. The method of claim 1, wherein the current texture block corresponds to a texture PU (prediction unit) or a texture CU (coding unit).

12. The method of claim 1, wherein the current texture block has a first block size selected from a first group consisting of 64×64, 64×32, 32×64, 32×32, 32×16, 16×32, 16×16, 16×8, and 8×16, and the partition block has a second block size selected from a second group consisting of 32×32, 16×16 and 8×8.

13. The method of claim 1, the derived DV is determined based on one or more disparity vectors of one or more neighboring blocks of the current texture block.

14. The method of claim 1, wherein a flag is transmitted in a sequence, view, picture, or slice level to indicate VSP type, wherein each partition block of the current texture block is partitioned into multiples sub-blocks according to the single partition decision if the flag is asserted, and each partition block of the current texture block is partitioned into multiples sub-blocks according to individual decision if the flag is not asserted.

15. An apparatus for three-dimensional or multi-view video encoding or decoding using VSP (view synthesis prediction), the apparatus comprising: a plurality of electronic circuits configured to:

receive input data associated with a current texture block in a dependent view, where the current texture block comprises multiple partition blocks;

locate a depth block in a reference view corresponding to the current texture block using a derived DV (disparity vectors);

derive a single partition decision for the current texture block using the depth block;

partition each partition block of the current texture block into multiples sub-blocks according to the single partition decision; and for each sub-block, determine a corresponding DV based on the depth block;

locate prediction data in the reference view using the corresponding DV; and apply inter-view encoding or decoding to said each sub-block using the prediction data.

16. The apparatus of claim 15, wherein each partition block is partitioned into multiples sub-blocks horizontally or vertically according to the single partition decision.

17. The apparatus of claim 15, wherein said multiples sub-blocks have a same size, each sub-block has sub-block width larger than sub-block height when the single partition decision has a first value, and each sub-block has the sub-block width less than the sub-block height when the single partition decision has a second value.

18. The apparatus of claim 15, wherein each partition block is partitioned into said multiples sub-blocks horizontally when the single partition decision has a first value, and each partition block is partitioned into said multiples sub-blocks vertically when the single partition decision has a second value.

19. The apparatus of claim 15, wherein the current texture block corresponds to a texture PU (prediction unit) or a texture CU (coding unit).

20. The apparatus of claim 15, the derived DV is determined based on one or more disparity vectors of one or more neighboring blocks of the current texture block.

* * * * *